United States Patent
Galstian et al.

(10) Patent No.: US 7,006,733 B2
(45) Date of Patent: Feb. 28, 2006

(54) METHOD AND APPARATUS FOR CHANNEL SELECTIVE CONTROL OF LIGHT PROPAGATION IN AN OPTICAL WAVEGUIDE

(75) Inventors: Tigran Galstian, Quebec City (CA); Armen Zohrabyan, Quebec City (CA); Dany Dumont, Quebec City (CA); Amir Tork, Cap Rouge (CA); Rouslan Birabassov, Quebec City (CA)

(73) Assignee: Photintech, Inc., Quebec (CA)

( * ) Notice: Subject to any disclaimer, the term of this patent is extended or adjusted under 35 U.S.C. 154(b) by 14 days.

(21) Appl. No.: 10/760,398

(22) Filed: Jan. 21, 2004

(65) Prior Publication Data

US 2004/0151434 A1 Aug. 5, 2004

Related U.S. Application Data

(63) Continuation of application No. 10/658,258, filed on Sep. 10, 2003, now abandoned.

(60) Provisional application No. 60/409,233, filed on Sep. 10, 2002.

(51) Int. Cl.
*G02B 6/34* (2006.01)
*G02B 6/14* (2006.01)

(52) U.S. Cl. .................. 385/37; 385/10; 385/28; 385/30

(58) Field of Classification Search ............. 385/10, 385/27–30, 37
See application file for complete search history.

(56) References Cited

U.S. PATENT DOCUMENTS

| 4,097,117 A |  | 6/1978 | Neil et al. ............... 350/96.17 |
| 4,227,769 A |  | 10/1980 | Phillips et al. ........... 350/96.19 |
| 4,986,624 A |  | 1/1991 | Sorin et al. ............. 350/96.19 |
| 6,058,226 A |  | 5/2000 | Starodubov ................ 385/12 |
| 6,522,795 B1 | * | 2/2003 | Jordan et al. ................ 385/10 |
| 6,628,850 B1 | * | 9/2003 | Yao ............................. 385/10 |

* cited by examiner

*Primary Examiner*—Michelle Connelly-Cushwa
(74) *Attorney, Agent, or Firm*—Ogilvy Renault LLP; Kent Daniels

(57) ABSTRACT

A variable optical device for selectively controlling propagation of light within an optical waveguide. The optical device comprises: a relief modulation defining a grating disposed proximal the waveguide and having a respective grating index of refraction $n_G$; a matrix surrounding at least the relief modulation, the matrix having an index of refraction $n_{EO}$ that is controllable, in response to a selected stimulus between a first value that is substantially equal to the grating index of refraction $n_G$, and a second value that is different from $n_G$; and at least one electrode for supplying the selected stimulus to the matrix-grating system.

15 Claims, 8 Drawing Sheets

Figure 6
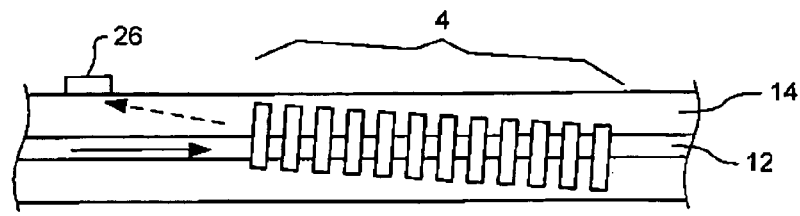
Figure 7a
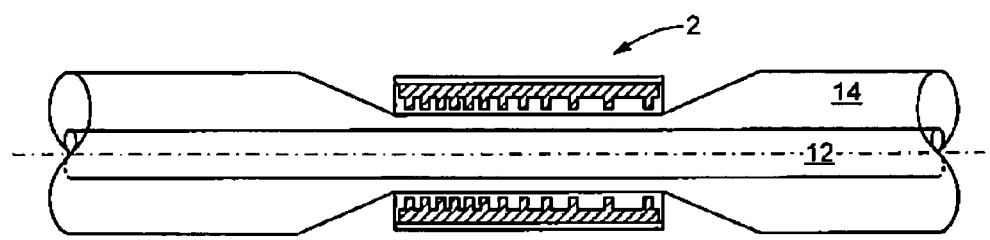
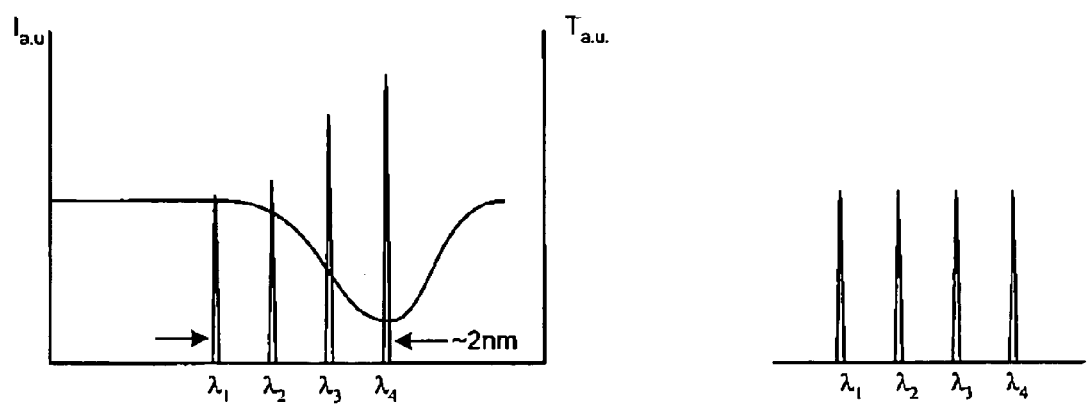
Figure 7b
Figure 7c

Figure 8a
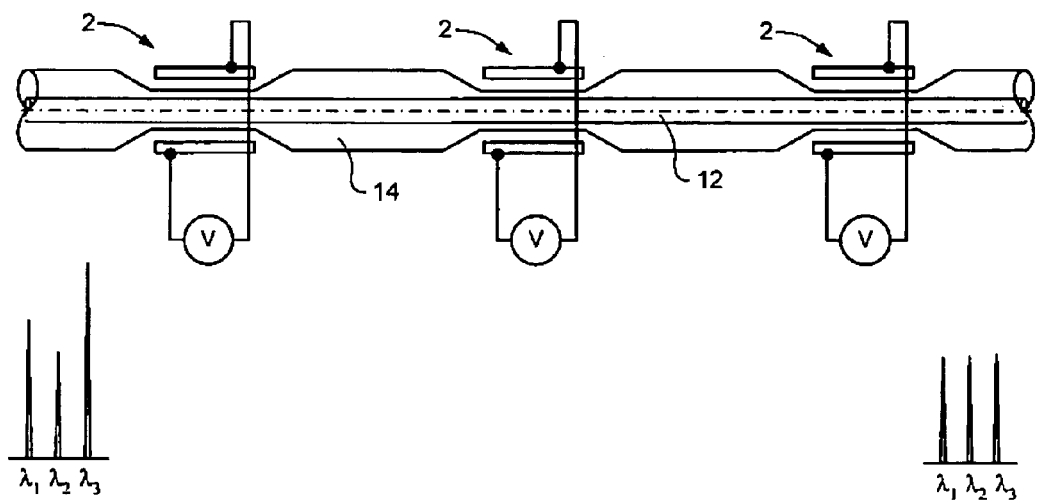
Figure 8b
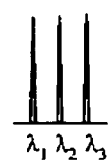
Figure 8c
Figure 9
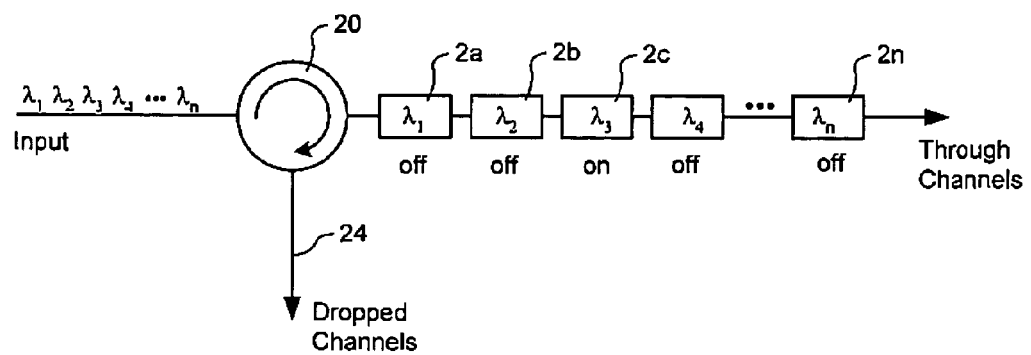

METHOD AND APPARATUS FOR CHANNEL SELECTIVE CONTROL OF LIGHT PROPAGATION IN AN OPTICAL WAVEGUIDE

CROSS-REFERENCE TO RELATED APPLICATIONS

This application is a continuation application of U.S. patent application Ser. No. 10/658,258 filed Sep. 10, 2003 now abandoned which is based on U.S. Patent Application Ser. No. 60/409,233 filed Sep. 10, 2002.

MICROFICHE APPENDIX

Not Applicable.

TECHNICAL FIELD

The present invention relates to controllable optical devices, and in particular to a method and apparatus for wavelength selective control of propagation of light in an optical waveguide.

BACKGROUND OF THE INVENTION

As is well known in the art, the successful implementation of optical communications systems requires devices capable of reliably controlling the propagation of light. Basic optical processing functions required in optical communications include, but are not limited to: optical modulation (which includes amplification and attenuation of optical power); phase control (delay); and switching. In Wavelength Division Multiplexed (WDM) and Dense Wavelength Division Multiplexed (DWDM) communications systems, significant channel power imbalance may be generated and channel equalization become necessary where the above noted basic functions must be performed on a per-channel basis.

In modern high performance optical communications systems, data rates of 10 GHz or more can be encountered on each channel. In addition, using known optical amplification techniques such as Raman pumping and Erbium Doped Fiber Amplification (EDFA), optical transmission spans of 1000 Km or more can readily be achieved.

As is known in the art, Raman pumping and EDFA typically do not produce a flat gain profile across the spectral window of interest. Typically, a flat gain response is obtained by the use of filters which impose wavelength-dependent losses to counterbalance gain variations of the EDFA. Gain profiles of high flatness can be achieved using this approach, but only within the specific design parameters of the amplifier, which are specified by customers to meet their particular link budgets.

However, in practice, the input signal level can vary in time (e.g., the number of wavelength channels and/or the optical power in one or more channels can change), which changes the gain profile of the EDFA. If the gain flattening filters are static, changes in the input signal level can produce "gain tilt" (i.e., different wavelengths will have different gain). When gain tilt is amplified by successive EDFAs along a network link, significant optical power variations across the transmission window can be produced at a receiver. This problem can be solved using variable optical attenuators (VOAs), which enable the design of filters having a controllable attenuation.

Various types of VOAs are known, using, for example, mechanical, thermal and electrical mechanisms of activation. For example, U.S. Pat. Nos. 5,966,493 and 6,370,312 (both to Wagoner et al.) teach tunable optical attenuators in which the cladding of an optical fiber is side-polished to expose a surface though which light propagating in the fiber core can escape. A controllable refractive index material is positioned against this surface. Changes in the refractive index of the controllable index material can be used to control the amount of light coupled out of the fiber core. U.S. Pat. No. 6,011,881 (Moslehi et al.) teaches a tunable optical filter in which the cladding of an optical fiber is side-polished in the vicinity of a Fiber Bragg Grating (FBG). A controllable refractive index material is positioned against this surface. Changes in the refractive index of the controllable material can be used to vary the effective refractive index of the core material, and thus the reflective wavelength $\lambda_R$ of the FBG.

U.S. Pat. No. 4,986,624 (Sorin et al.) teaches an optical fiber evanescent grating reflector, in which the cladding of an optical fiber is side-polished to expose a surface that is penetrated by the evanescent field of light propagating in the fiber core. A grating placed on the exposed surface causes reflection of light at a selected wavelength. The amount of optical energy reflected is a function of the strength of interaction between the evanescent field of guided modes and the reflection grating, and thus can be controlled by varying the distance between the reflection grating and the exposed surface.

Because the above devices require a side-polished fiber, the optical properties of which are also highly dependent on the radius of curvature, the effective length of the polished zone and the distance between the exposed surface and the fiber core, they tend to be difficult to manufacture. They also tend to be highly sensitive to temperature and mechanical distortions. Additionally, because of the curvature and asymmetry of the side-polished fiber, its optical performance may be polarization dependent, which in many cases is undesirable. Finally, in each of the above-described devices, tuning is accomplished by mechanical movement of one or more components. This increases costs and imposes severe performance limitations, which is highly undesirable.

The paper "*Electronically Switchable Bragg Gratings Provide Versatility*", A. Ashmead, Lightwave Magazine, March 2001, describes a VOA structure in which the grating structure is formed entirely within an electrically controllable material. In this case, the waveguide core is covered by an initially liquid matrix of liquid crystal (LC) and monomer. Holographic photo-polymerization is then used to align and create periodically distributed micro droplets of undisolved LC molecules. This alignment of the LC molecules (along the light propagation direction) creates an effective refractive index $n_{LC}$ of the LC droplets, which matches the refractive index $n_P$ of the matrix. This structure is thus optically uniform. However, application of an electric field reorients the LC molecules, which changes the effective refractive index of the LC droplets. This results in the grating structure being "revealed" within the matrix under control of the applied electric field.

This technique suffers a disadvantage in that, in order to reveal the grating at reasonably low voltages, the LC droplets must be relatively large. This intrinsically generates light scattering (e.g. from 5% to 10%) and highly undesirable crosstalk. In addition, the choice of the spectral function of the grating is rather limited, because the alignment of LC molecules (to get $n_{LC}=n_P$) is obtained due to the gradient of polymerization and the formation of periodic planes of micro-droplets of LC molecules. Consequently, only a very limited number of different holographic patterns can be used to expose the monomer solution, without compromising the critical alignment of the LC director. Finally, this method is suitable only for planar guiding structures, because it is difficult to obtain the required LC alignment on a circular geometry guide (fiber).

The paper *"Electrically Controllable Long-Period Liquid Crystal Fiber Gratings"*, Y. Jeong et al., IEEE Photonics Technology Letters, Vol. 12, N5, p.p. 519–522, May, 2000 proposes a solution in which an electrically controllable LC core fiber grating is used. An electrode having a comb-structure is used to periodically reorient the LC director, which generates an optical grating in the core region. This LC fiber grating has several drawbacks. First, it has high insertion losses due to the junctions between glass and LC core waveguides. Second, the propagation of light in a LC-core guide will inevitably suffer from scattering losses and nonlinearities since light is concentrated in the core area. Finally, current electrode fabrication technology allows the fabrication of only long period gratings.

Accordingly, efficient, electronically controllable optical devices remain highly desirable.

SUMMARY OF THE INVENTION

Accordingly, an object of the present invention is to provide a high efficiency, electronically controllable variable optical attenuator.

An aspect of the present invention provides a variable optical device for selectively controlling propagation of light within an optical waveguide. The optical device comprises: a relief modulation defining a grating disposed proximal the waveguide and having a respective grating index of refraction $n_G$; a matrix surrounding at least the relief modulation, the matrix having an index of refraction $n_{EO}$ that is controllable, in response to a selected stimulus between a first value that is substantially equal to the grating index of refraction $n_G$, and a second value that is different from $n_G$; and at least one electrode for supplying the selected stimulus to the matrix-grating system.

BRIEF DESCRIPTION OF THE DRAWINGS

Further features and advantages of the present invention will become apparent from the following detailed description, taken in combination with the appended drawings, in which:

FIG. 6 schematically illustrates principle elements and operation of a channel monitor implemented using the optical device of the present invention;

FIGS. 7a–7c schematically illustrate principal elements and operation of a quasi-broadband gain flattening filter implemented using the optical device of the present invention;

FIGS. 8a–8c schematically illustrate principal elements and operation of alternative gain flattening or channel equalization filters implemented using the optical device of the present invention;

FIG. 9 schematically illustrates principal elements and operation of an optical add-drop system implemented using the optical device of the present invention.

It will be noted that throughout the appended drawings, like features are identified by like reference numerals.

DETAILED DESCRIPTION OF THE PREFERRED EMBODIMENT

The present invention provides an optical device for controlling propagation of light in an optical waveguide, such as an optical fiber. The device of the present invention may be used in optical communication systems as a variable optical attenuator (VOA), variable coupler, and/or a dynamic dispersion compensator.

For the sake of brevity, the following description will focus on optical fibers and simple relief gratings, while other types of wave guiding structures (including planar integrated) and complex relief modulations (including, reflective, transmissive, tilted or other types of gratings) may equally be used. Similarly, embodiments using electro-optic materials will be described, it being understood that other (e.g. thermo-optic or magneto-optic) materials may be used instead.

Figure 1A:
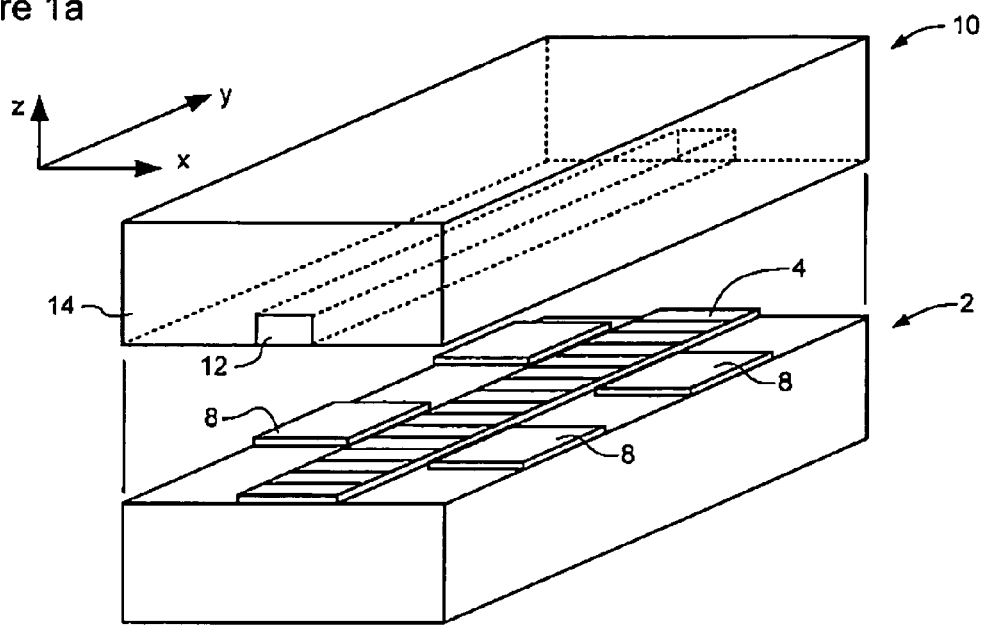
FIGS. 1a–1c schematically illustrate principal elements and operation of an optical device in accordance with the present invention.
Figure 1B:
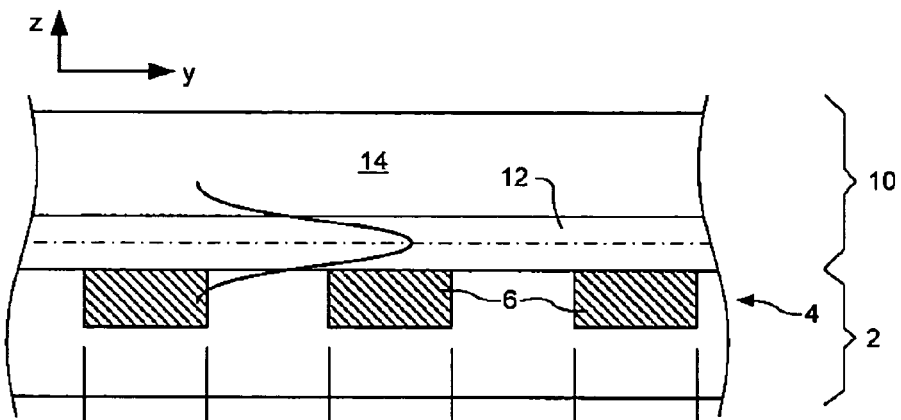
Figure 1C:
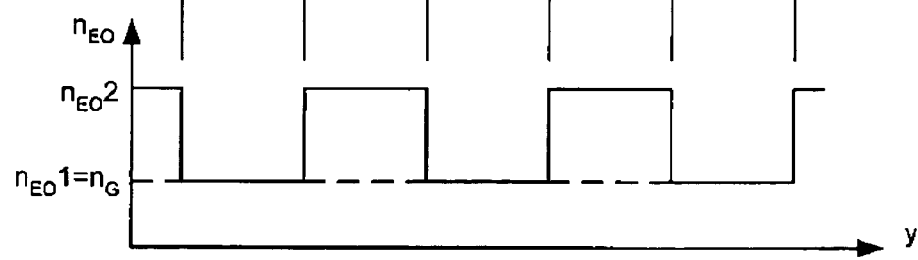

Referring to FIGS. 1a–1c, the present invention generally provides a hidden relief modulation (HRM) cell 2 comprising an optical grating 4 surrounded by a matrix 6 having a controllable index of refraction. Note that the matrix 6 is not shown in the exploded view of FIG. 1a. One or more pairs of electrodes 8 are provided to apply a selected stimulus (e.g. voltage, current, heat etc.) to at least the matrix 6, to thereby control its refractive index. In use, the HRM cell 2 is positioned proximal a waveguide 10 having a core 12 surrounded by a cladding 14, so as to affect desired modes (e.g. core modes, cladding modes and/or evanescent field) of light propagating within the waveguide.

The optical grating 4 is preferably provided as a relief modulation formed in a grating medium having a respective grating index of refraction $n_G$. The grating 4 can be formed using any suitable method, such as etching, as is well known in the art. The grating medium can also provide a substrate for supporting the electrodes 8, as shown in FIG. 1a. Such a substrate may also contain recesses defining a chamber for retaining the matrix 6. The design of the grating 4 can be selected to obtain the desired spectral characteristics of the device, as will be described in greater detail below. In simple embodiments, the grating index of refraction $n_G$ is substantially fixed. In such cases, $n_G$ is preferably substantially equivalent to the index of refraction of the waveguide cladding 14 ($n_{CLAD}$). This can readily be accomplished by using the same material (e.g. glass) for both the waveguide cladding 14 and the grating medium.

The matrix 6 has an index of refraction ($n_{EO}$) which varies in response to a predetermined stimulus. Known electro-optical, magneto-optical and/or thermo-optical materials (such as, for example, Liquid Crystal materials) may be used for this purpose. By suitable selection of the matrix 6, and the applied stimulus, the index of refraction $n_{EO}$ can be driven between a first value $n_{EO1}=n_G$ ($=n_{CLAD}$) and a second value $n_{EO2} \neq n_G$, as shown in FIG. 1c. When $n_{EO}=n_{EO1}=n_G$, the HRM cell 2 presents a uniform index of refraction (corresponding to that of the cladding for all wavelengths for which $n_{EO}=n_G=n_{CLAD}$). In this situation, the grating 4 is "hidden", and light propagates through the waveguide 10 substantially without loss. On the other hand, when $n_{EO}=n_{EO2}\neq n_G$, the grating 4 is "revealed" and diffraction of light (and its loss) from the waveguide 10 will be proportional to $n_G-n_{EO}$. Thus it is possible to control attenuation and, to some extent at least, its spectral form by controlling $n_{EO}$.

As is well known in the art, liquid crystal (LC) materials are known to exhibit high electro-optic sensitivity and a strong difference (up to 0.28) between ordinary ($n_o$) and extraordinary ($n_e$) refractive indices. The LC material and its molecular orientation can be chosen such that the ordinary and extraordinary refractive indexes "bracket" the refractive index $n_{CLAD}$ of the cladding at the desired wavelength of operation $\lambda_o$. For example, if the grating and cladding are made of silica glass ($n_G=n_{CLAD}=1.444$ @ $\lambda=1550$ nm), one of the ordinary and extraordinary refractive indexes can be selected to equal $n_G$. In either case, the LC material and surface treatment can be chosen to obtain a "relaxed state" LC molecular orientation for which the average refractive index of the LC ($n^{Av}_{LC}$) matches the refractive index of the grating $n_G$ (see FIG. 1c), to thereby place the grating 4 into its "hidden" state. Application of an electric field, for example, can then be used to reorient the LC molecules, and thereby change the average refractive index ($n^{Av}_{LC}$) to create periodic variations in the refractive index seen by the propagating light, and thus bring the grating 4 into its "revealed state" for the appropriate polarization states.

Various well known methods can be used to achieve suitable anchoring conditions and obtain the desired "relaxed state" LC molecular orientation. Techniques such as chemical deposition, rubbing, application of pixelated electrodes, photosensitive layers, light exposition, particle deposition or charged beam exposition, may be used to achieve the desired alignment. Possible alignments include: planar homogenous with director pointing along the light propagation direction; radial or homeotropic alignment; planar azimuthal alignment; and tilted alignment. Hybrid geometries may be obtained when the anchoring at various points or boundaries are different. All these alignments may be varied in the space (e.g. along the length of the waveguide) to obtain desired (e.g., polarization independent) properties of the device.

Reorientation of LC molecules may be generated in various directions using not only the electric field direction but also its oscillation frequency, as is well known in the art. Dual frequency LC materials may also be used in combination with frequency switching of the driving electric field to obtain richer orientation options. In the particular case of magnetic or electric field control, LC compositions having either positive or negative dielectric susceptibility $\Delta\epsilon$ may be used. In the case of positive $\Delta\epsilon$, liquid crystal molecules will be attracted by the electric field, and will tend to align themselves with the applied electric field. In the case of negative $\Delta\epsilon$, the LC molecules are repulsed from the applied electric field, and will tend to be distributed in the plane perpendicular to the applied electric field.

As described above, the present invention uses the matrix 6 to selectively "hide" and "reveal" the grating. The spectral performance characteristics (e.g. bandwidth, spectral profile shape, center-wavelength etc.) are defined by the design of the grating 4. In this way, various forms of relief modulation (grating) may be created (e.g. periodic; non-periodic; apodized; chirped etc.), using known techniques to obtain the desired spectral performance. Various choices may be made for the matrix 6 (eg. LC composition, molecular alignment, guide geometry, its refractive index and dielectric susceptibility anisotropy, etc.) all of which are within the purview of those of ordinary skill in the art. In applications where only phase modulation is required, the average refractive index of the grating cell 2 would not exceed the average refractive index of the core 12, to prevent the device from functioning as an attenuator via light leakage.

Using the techniques of the present invention, various optical devices can be developed using one or more modulator cells 2. FIGS. 2a–2h show various possible cell designs.

Figure 2A:
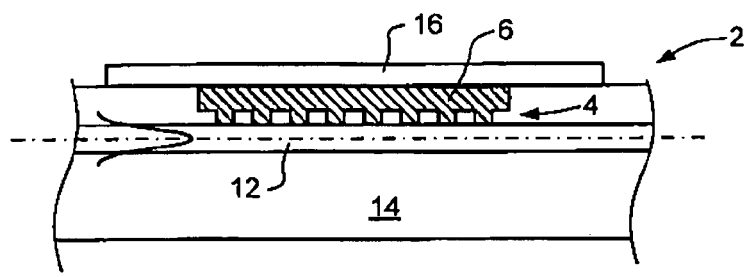
FIGS. 2a–2h are longitudinal cross sectional views showing respective alternative embodiments of the present invention.
Figure 2B:
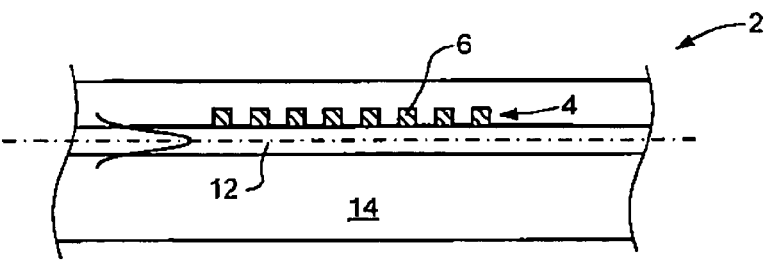

In the embodiments of FIGS. 2a and 2b, the grating 4 is positioned in contact with an exposed surface of the waveguide core 12, as may also be seen in FIG. 1. In this configuration, revealing the grating 4 has the effect of reflecting optical energy within the waveguide core 12. The proportion of reflected energy is a function of the refractive index difference $n_G-n_{EO}$ between the grating 4 and the matrix 6, thus yielding a wavelength selective variable optical attenuator (VOA) function. In FIG. 2a, the grating is formed by etching through the cladding 14 to periodically expose the surface of the core 12 (thus the cladding 14 is the grating medium). The etched region is then filled with matrix 6, and then capped with a cover plate 16 which supports one or more electrodes 8 in close proximity to the matrix 6. In the embodiment of FIG. 2b, and illustrated in perspective in FIG. 1a, the grating 4 is formed (e.g. by etching or replication) on a face of the cover plate 16. The waveguide core 12 is formed in the surface of a substrate, which also serves as the cladding 14. The cover plate 16 is placed on top of (and in contact with) the waveguide core 12, and spaces between the cover plate 16 and the waveguide core 12 filled with the matrix 6. Electrodes placed on the waveguide substrate and/or cover plate 16 enable stimulation of the matrix 6.

Figure 2C:
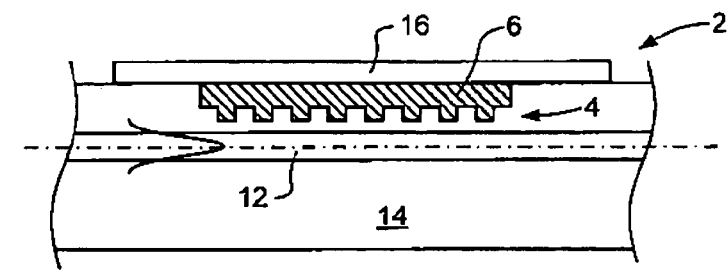
Figure 2D:
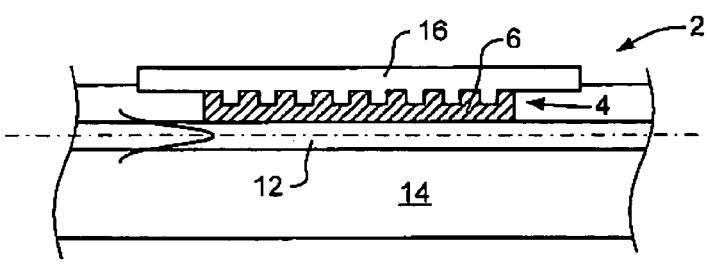

The embodiments of FIGS. 2c and 2d are similar to those of FIGS. 2a and 2b, respectively, except that the grating 4 is positioned a small distance from the waveguide core 12. In the configurations of FIGS. 2a–2d, the grating interacts with the evanescent field of light propagating in the core 12. With this arrangement, revealing the grating 4 has the effect of imposing a phase shift, diffraction, reflection and/or leaking or scattering optical energy out of the waveguide core 12. A "pure" phase shifting function is obtained by limiting the average refractive index of the grating cell 2 to a maximum value equal to the effective refractive index $n_{CORE}$ of the core 12. Within this limit, the amount of phase shift obtained is a function of the refractive index difference $n_G-n_{EO}$ between the grating 4 and the matrix 6. If the average refractive index $n_{AVG}$ of the cell 2 rises above the effective core refractive index $n_{CORE}$, then light is leaked and scattered out of the waveguide core 12, thus yielding a VOA function. The proportion of energy scattered is a function of the difference between the average refractive index $n_{AVG}$ of the cell 2 and the effective core refractive index $n_{CORE}$.

Figure 2E:
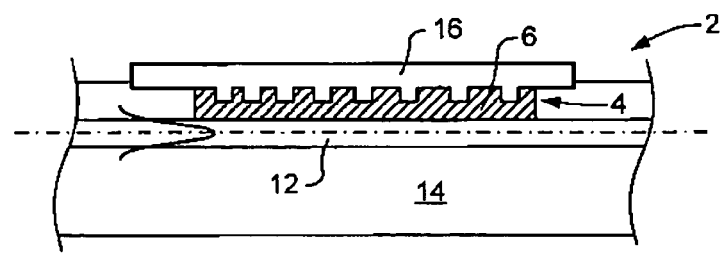
Figure 2F:
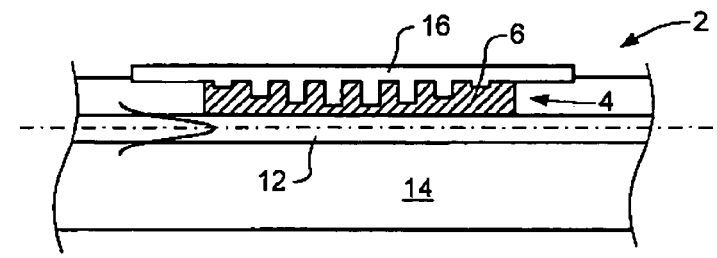
Figure 2G:
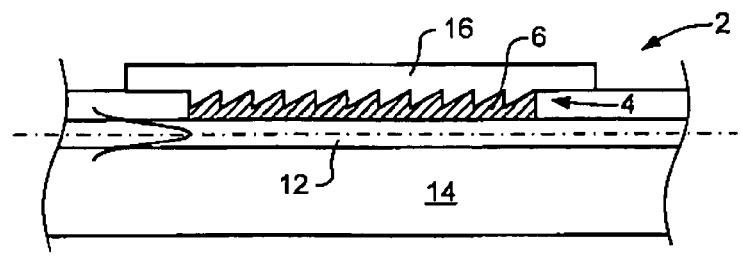

FIGS. 2e–2g show respective cells 2 with higher-complexity gratings 4. FIG. 2e shows a cell 2 having a chirped grating 4, whereas FIG. 2f shows a cell in which the grating 4 has a variable depth. Any other grating design may be used, as required, to obtain the desired optical performance. FIG. 2g illustrates a cell 2 in which the grating 4 is constructed using a "saw-tooth" or blazed profile. This arrangement can be used to provide angular deviation and asymmetric diffraction, depending upon the light propagation direction (with respect to the blazing direction).

Figure 2H:
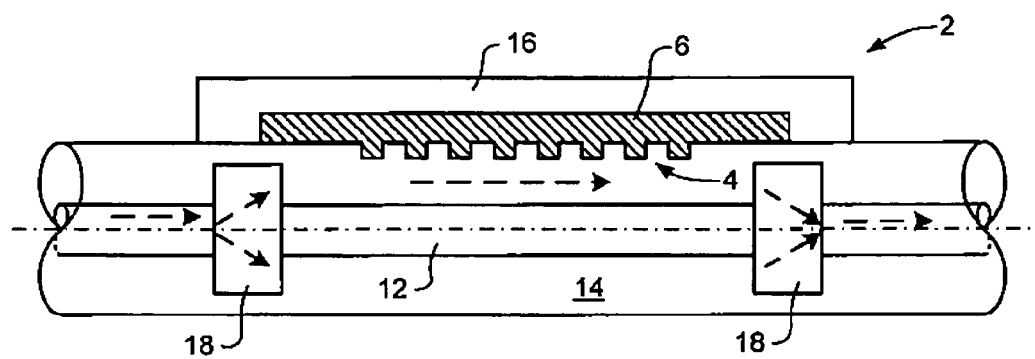

FIG. 2h illustrates a further embodiment of the invention, in which the cell 2 is arranged to act upon cladding modes (i.e. light propagating within the cladding) rather than the core modes. In this case, any of the cell configurations described above with reference to FIGS. 2a–g may be utilized. However, the grating 4 is defined relative to the cladding 14, rather than the core 12. Various known mode-converting elements 18 (such as in-core long period gratings or tapered fibers) can be used to transform the core modes into cladding modes upstream of the cell, and then couple the (thus modulated) cladding modes back into the core modes down stream of the cell 2. This approach simplifies device fabrication and gives even more choice on the type of waveguide, matrix 6 and grating substrate form and composition.

Figure 3A:
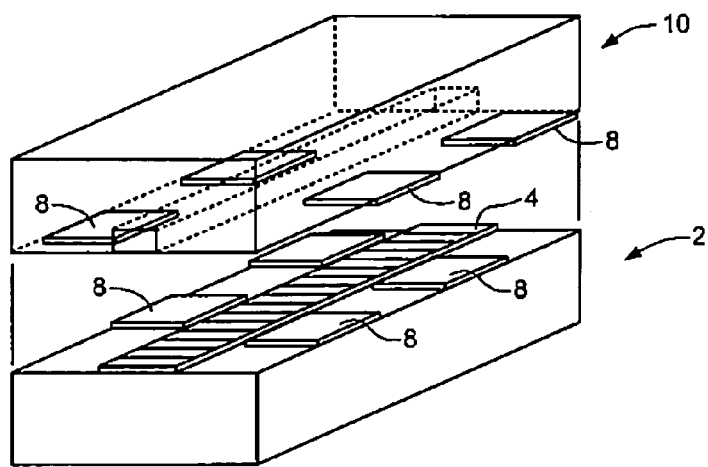
FIGS. 3a and 3b schematically illustrate three dimensional electrode configurations usable in embodiments of the present invention.
Figure 3B:
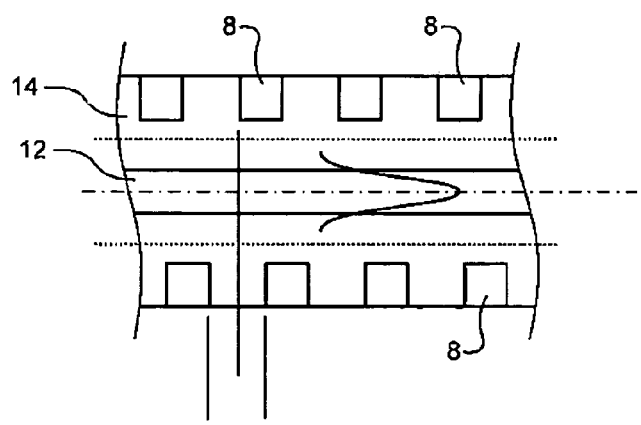

As described above, the matrix 6 can be stimulated by suitably arranged electrodes 8. In a simplest design, a pair of electrodes 8 can be arranged on opposite sides of the matrix, so as to generate a substantially uniform electric field in the vicinity of the grating 4. However, more sophisticated functionality can be obtained by using a "pixilated" electrode system in order to shape the electric field. FIGS. 3a and 3b illustrate one possible arrangement, in which multiple electrodes 8 are positioned on the waveguide substrate and the coverplate. Electrodes on the grating substrate and waveguide substrate are separated from one another by predetermined in-plane (and, if desired, vertical) spacings. These in-plane and vertical separations provide a three-dimensional volume field surrounding the grating 4, within which arbitrary LC director orientations can be created.

Preferably, each of the electrodes 8 is positioned in close proximity to the matrix 6, but far enough away from the waveguide core 12 to avoid "contact" with the core mode's evanescent field, as is schematically shown in FIG. 3b. This arrangement has an advantage that it provides high optical transparency (thus low insertion losses). In fact, this will significantly reduce not only the light absorption due to the inherent complex refractive index of electrodes but also the fabrication complexity.

Figure 4A:
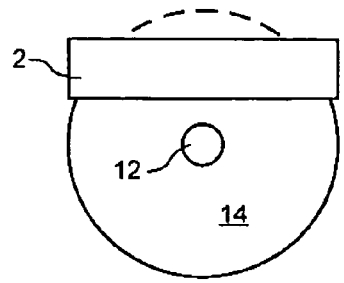
FIGS. 4a and 4b are lateral cross sectional views showing respective alternative embodiments of the present invention.
Figure 4B:
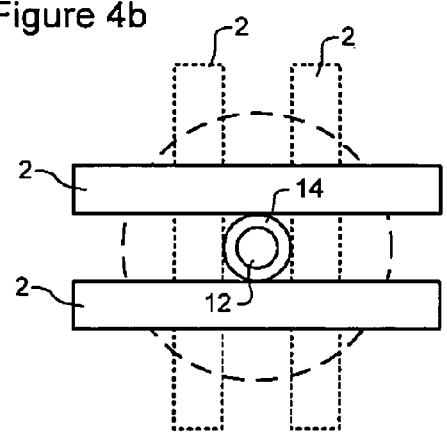

All of the embodiments of FIGS. 2a–2g can be implemented using waveguides in the form of "integrated" guides formed in a substrate (as shown in FIGS. 1a and 3a) or optical fibers. In the case of fiber-based devices, the fiber can be side-polished (as shown in FIG. 4a) or symmetrically etched (FIG. 4b) or otherwise cladding-reduced to access the core mode's evanescent field. As shown in FIG. 4b, symmetrical etching of the fiber-guide enables more cells 2 to be placed on different sides of the core 12. Furthermore, cells 2 can have different modulations and can be arranged at different angles about the core 12, and can be shifted with respect to each other to obtain desired polarization (e.g. polarization independent) or spectral performance. Thus, for example, we can use two independently controllable hidden grating cells of different periods and modulation forms acting on the same evanescent field. This may generate specific spectral and directional (e.g. different for two opposite propagation directions) properties that are difficult to achieve by a single cell 2 and which, in addition, may be dynamically varied by means of the individual control of each cell 2.

Figure 5A:
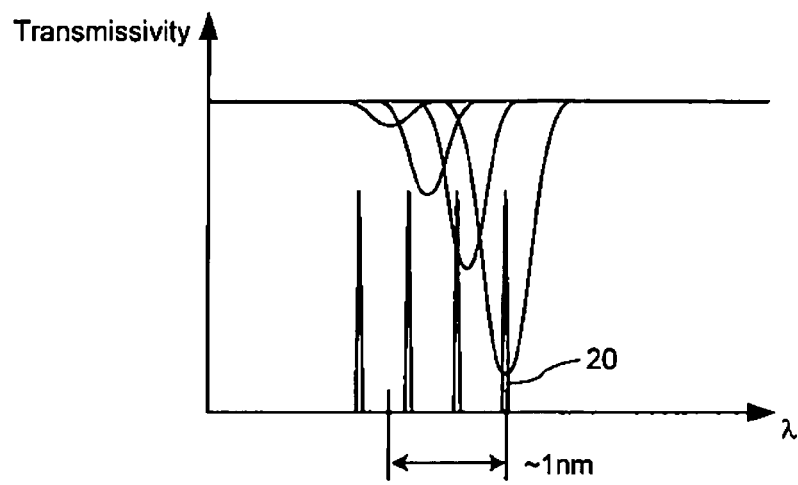
FIGS. 5a–5c schematically illustrate operation of a further alternative embodiment of the present invention.

In the embodiments described above with reference to FIGS. 1–4, the grating 4 has a substantially fixed index of refraction $n_G$, which preferably matches that of the cladding 14 $n_{CLAD}$. However in these cells the effect of the changing the index of refraction of the matrix 6 can create a problem in the form of cross-talk between adjacent telecommunications channels. In particular, consider an example in which the grating length is L=1 cm and the relief modulation depth is h=300 nm. In order to obtain a high maximum reflectivity (e.g. R≈100%) and a bandwidth of 50 GHz (1 WDM channel), the refractive index of the matrix 6 must be changed by Δn≈0.03. This level of refractive index change can be readily achieved. However, doing so will also result in a shift in the grating's Bragg resonance wavelength $\lambda_B$ of about 1 nm, as shown in FIG. 5a. The standard International Telecommunications Union (ITU) 50 GHz spectral grid results in a channel spacing of about 0.4 nm at a wavelength of 1550 nm, which means that two or more adjacent channels will be "hit" as the grating 4 is progressively revealed to reflect (and/or scatter or leaked out) the desired target channel 20.

This problem persists for dynamic channel equalization applications, where smaller attenuations are needed, such as, for example, 10 dB attenuation, which requires a reflectance of about R=90%. The refractive index of the matrix 6 must then be changed by Δn≈0.017. This will lead approximately to 0.8 nm spectral shift of the Bragg resonance wavelength $\lambda_B$, again hitting adjacent channels. Another (even more disastrous) effect is the introduction of additional (and variable) dispersion imparted to each channel due to the changing Bragg resonance wavelength $\lambda_B$.

This problem can be addressed by designing a cell 2 in which both the grating 4 and matrix 6 are variable refractive index materials, which display opposite refractive index changes for a given stimulus input.

Figure 5B:
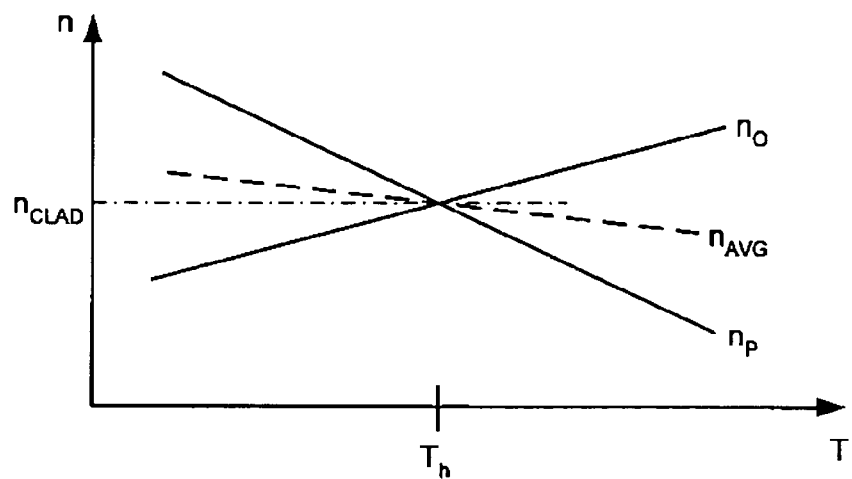

For example, it is well known that many organic materials, such as polymers, exhibit decreasing refractive index with increasing temperature. For these materials, $$\frac{dn_P}{dT} < 0,$$

as shown in FIG. 5b. However, the situation is different for liquid crystals having molecules oriented in the direction of light propagation, or (solid) polymers which have been mechanically stretched in the direction of light propagation. These materials are optically anisotropic, and light propagating in the direction of the anisotropy axis "sees" the material's ordinary refractive index $n_0$. In the majority of cases, this ordinary refractive index $n_0$ increases with increasing temperature; thus $$\frac{dn_0}{dT} > 0.$$

The magnitude of $$\frac{dn_0}{dT}$$

varies from material to material. The same goal $$\left(\text{i.e. } \frac{dn_o}{dT} > 0\right)$$

may be also achieved using new composite organic-inorganic materials.

Thus it is possible to construct a cell 2 in which the grating 4 is composed of a first controllable index material (e.g. a solid polymer) having a $$\frac{dn_P}{dT} < 0$$

and the matrix 6 (e.g. a suitably oriented liquid crystal or stretched polymer) having a $$\frac{dn_0}{dT} > 0.$$

In this case, the hidden grating state will be achieved at the temperature $T_h$ (intersection of the curves $n_p(T)$ and $n_o(T)$), for which we have $n_p(T_h)=n_o(T_h)$, as shown in FIG. 5b. Changing the cell temperature by $\Delta T$ (by either heating or cooling) causes corresponding changes in $n_p$ and $n_o$, to thereby reveal the grating 4.

As shown in FIG. 5b, the average refractive index of the cell 2 varies as $$\frac{dn_{AVG}}{dT}.$$

Figure 5C:
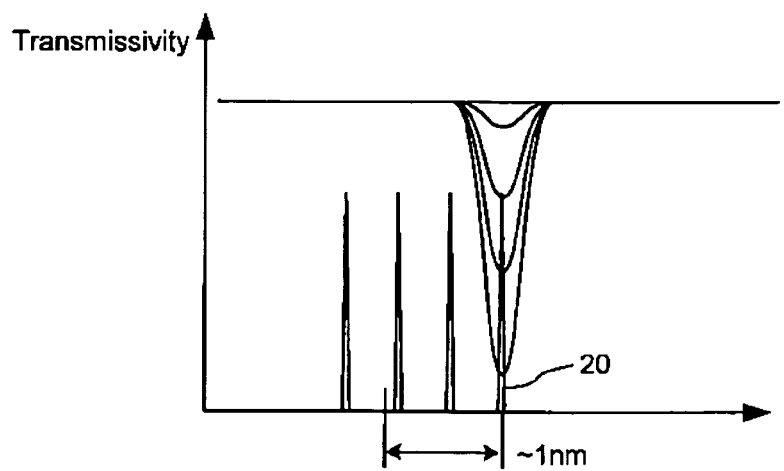

When the absolute magnitudes of $$\frac{dn_0}{dT}$$

and $$\frac{dn_P}{dT}$$

are equal, we obtain $$\frac{dn_{AVG}}{dT} = 0,$$

and revealing the grating 4 is accompanied by no net change in the cell refractive index, and thus no spectral shift of the Bragg resonance wavelength $\lambda_B$, as shown in FIG. 5c. In many cases, however, there will be some (preferably small) difference between the magnitudes of $$\frac{dn_0}{dT}$$

and $$\frac{dn_P}{dT}.$$

In this case, $$\frac{dn_{AVG}}{dT} \neq 0,$$

and revealing the grating 4 will be accompanied by a change in the cell refractive index. This will produce a spectral shift of the Bragg resonance wavelength $\lambda_B$. However, because $$\frac{dn_{AVG}}{dT}$$

is smaller than either of $$\frac{dn_0}{dT}$$

and $$\frac{dn_P}{dT},$$

the change in $\lambda_B$ is similarly reduced.

One method of fabricating the HRM cell 2 is to form a grating 4 (e.g. by etching) on a substrate on or near the waveguide guide core 12, as described above with reference to FIGS. 1–3. Another possible method is the use of light curable composite (e.g., polymer based) materials. In this case, a fiber with a partially removed cladding (FIGS. 4a–4b) may be introduced into an optically (e.g. UV) curable liquid. An alternating (e.g. interference) pattern of light is projected (e.g. holographically or otherwise) to the light curable material in order to polymerize a portion of the composite in contact with the guide surface (but without completing polymerization of the whole volume). The spatial period of exposition and material refractive index are chosen to produce a grating 4 having the desired optical characteristics. The partial washing out of the non-polymerized (or partially polymerized) material will reveal the grating structure, which, after being finally fixed (e.g. by baking), may then be covered by another controllable index material having a different (preferably an opposite) refractive index dependence on the control stimulus (e.g. temperature). The grating 4 thus obtained will be hidden if the system is held at the temperature $T_h$ (as described above).

Another way of fabricating a cell 2 is to dope a liquid crystal material with photosensitive (for example, a photo-polymerizable monomer) complexes. Then, the molecules of the liquid crystal mixture are aligned along a given direction with respect to the waveguide 10 (preferentially along the light propagation axis). Photo-exposition of the material by a light interference pattern will then initiate local photochemical changes of the material (e.g., polymerization), thereby forming grating like polymer stabilized liquid crystal (PSLC) zones. In this case, the application of a control excitation (voltage, heat, etc.) will change the local refractive index of the material differently in polymerized and non-polymerized zones. Thus, if in the ground (non-excited) state the refractive index is the same in all zones, then after the excitation is applied, differential refractive index changes in each of the polymerized and non-polymerized zones will reveal the grating structure. To obtain a desired (or maintain a constant) average refractive index $n_{AVG}$, combined heat and electrical excitation may be used. Note that in contrast to polymer dispersed liquid crystals (PDLC), used in the prior art (see, for example, "*Electronically Switchable Bragg Gratings Provide Versatility*", by A. Ashmead), PSLCs have no LC droplets and no scattering.

As described above with reference to the embodiments of FIG. 2, the effect of revealing the grating 4 is reflection of inbound optical energy. The proportion of reflected energy is a function of the difference in the refractive indices of the grating 4 and the surrounding matrix 6. In embodiments in which the grating vector is parallel with the waveguide core 12, reflected energy usually remains within the core 12. Incorporation of a predetermined angle of tilt between the grating 4 (that is, its wave vector) with respect to the optical propagation axis can be used to out-couple at least some of the reflected energy into the cladding 14, as shown in FIG. 6. Such an arrangement allows the minimization of back-propagation within the waveguide 10. If a photodetector 26 (or an array of detectors) is placed in the path of the reflected energy, then this arrangement can also be used to monitor the optical power level at the channel wavelength(s) lying within the bandwidth of the grating 4. Thus, an in-fiber optical performance monitor can be created with low loss and in a cost-effective way.

As may be appreciated, the HRM cell 2 of the present invention can be used to implement a wide variety of optical devices. For example, the quasi-broadband performance of a chirped grating (FIG. 2e) can be used to construct a gain flattening filter, as illustrated in FIGS. 7a–7c. Thus, a single grating cell 2 (FIG. 7a) can be used to impose a smoothly varying optical transmission loss over a bandwidth covering several communication channels (e.g., about 2 nm, as shown in FIG. 7b). Channels lying within that band experience differential optical attenuation, which yields a substantially uniform channel optical power levels at the output of the cell 2, as shown in FIG. 7c. The spectral properties of such a chirped grating may be changed if spatially distributed (or pixelated) electrodes are used to control only certain parts of the grating.

The gain flattening filter illustrated in FIGS. 7a–c is suitable in situations where channel power levels vary monatonically. Non-monotone or random channel power variations can be compensated by cascading successive narrowband grating cells (e.g. having multiple un-chirped gratings or multiple-electrode chirped gratings) to independently control the power level of each channel, as shown in FIGS. 8a–8c.

Another application of the present invention includes a selective channel drop system, such as is shown in FIG. 9. In the illustrated embodiment, a series of successive narrowband grating cells 2 are cascaded along a waveguide 10. Each grating cell 2 is designed to selectively reflect a respective channel wavelength, when in the "revealed" state. A circulator 22 at the input end of the cascade then routes the reflected optical channels to a "dropped" channel output 24.

Figure 10:
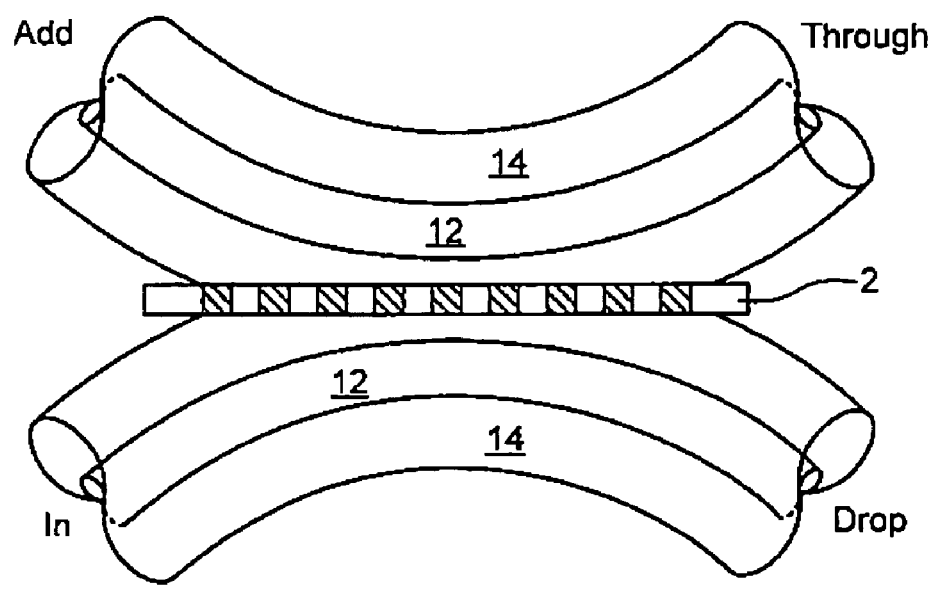
FIG. 10 schematically illustrates principal elements of a further optical add-drop system implemented using the optical device of the present invention.

The HRM cell 2 may be used as a cladding layer to construct wavelength selective all-fiber reconfigurable couplers and add/drops. To do so, the cell 2 may be placed near to the evanescent fields of two waveguides, preferably between them, as shown in FIG. 10. These guides may be, for example, a pair of fibers (as shown) or a double-core fiber with partially removed cladding (not shown). Planar waveguides, placed one on the top of the other could also be assembled with a grating cell sandwiched between them. This arrangement allows vertical guide coupling and higher level (multi-layer) optical integration.

In the "hidden" state, the grating cell 2 is "seen" by the core modes as a uniform film. If desired, it can be designed to also serve as a single mode or multimode waveguide element. In the latter case, it may provide some quasi-broadband coupling between two guides or, alternatively, play the role of a barrier if its average effective refractive index is relatively low. The application of external excitation (e.g. electric field, current, heat, etc.) will change the guiding conditions of the whole system, depending upon the materials' refractive index changes. For example, if the grating 4 is revealed, then the coupling of guides will be affected ("frustrated") by the grating 4. On the other hand, if the average refractive index is changed, but the grating is not revealed, then the broadband coupling efficiency is changed.

The same principle of the hidden relief modulation can be used also in other geometries; in the form of a substrate for fused/tapered couplers; or as an intermediate layer between two fiber half-couplers to provide a channel drop function without the use of a circulator.

The embodiment(s) of the invention described above is(are) intended to be exemplary only. The scope of the invention is therefore intended to be limited solely by the scope of the appended claims.

We claim:

1. A variable optical device for selectively controlling propagation of light within an optical waveguide, the optical device comprising:
   a hidden relief modulation (HRM) cell disposed proximal the optical waveguide, the HRM cell comprising:
      a relief modulation defining a grating disposed on a surface of the HRM cell opposite the waveguide and having a respective grating index of refraction $n_G$; and
      at least one electrode disposed on the surface of the HRM cell adjacent the relief modulation; and
   a matrix disposed between the HRM cell and the optical waveguide, the matrix being in electrical contact with the at least one electrode and surrounding at least the relief modulation, the matrix having an index of refraction $n_{EO}$ that is controllable, in response to a selected stimulus between a first value that is substantially equal to the grating index of refraction $n_G$, and a second value.

2. An optical device as claimed in claim 1, wherein the relief modulation is disposed relative to the waveguide so as to interact with any one or more of:
   core modes of light propagating within the waveguide;
   an evanescent field of light propagating within the waveguide; and
   cladding modes of light propagating within the waveguide.

3. An optical device as claimed in claim 1, wherein the relief modulation comprises any one or more of: chirped; apodized and blazed relief modulations.

4. An optical device as claimed in claim 1, wherein the grating index of refraction $n_G$ is substantially fixed.

5. An optical device as claimed in claim 4, wherein the grating index of refraction $n_G$ is substantially equal to a cladding index of refraction $n_{CLAD}$ of a cladding layer of the waveguide.

6. An optical device as claimed in claim 1, wherein the grating index of refraction $n_G$ is variable in response to a predetermined stimulus.

7. An optical device as claimed in claim 6, wherein a sign of change of the grating refractive index $n_G$ in response to the stimulus is opposite the sign of change of the matrix refractive index $n_{EO}$ in response to the stimulus.

8. An optical device as claimed in claim 7, wherein an average refractive index of the grating and the matrix is substantially constant.

9. An optical device as claimed in claim 1, wherein the at least one electrode comprises an array of electrodes adapted to generate an arbitrary electric field in the vicinity of the grating.

10. An optical device as claimed in claim 9, wherein the electrodes are positioned out of contact with an evanescent field of light propagating in the waveguide core.

11. An optical device as claimed in claim 1, further comprising two or more relief modulations defining respective gratings, each grating being associated with at least one respective electrode.

12. An optical device as claimed in claim 11, wherein at least one grating is oriented relative to the waveguide differently from at least one other grating.

13. An optical device as claimed in claim 1, further comprising:
 a first mode converter disposed upstream of the relief modulation for converting core modes into cladding modes; and
 a second mode converter disposed downstream of the relief modulation for converting cladding modes into core modes.

14. An optical device as claimed in claim 1, wherein the relief modulation is oriented at an angle relative to a core of the waveguide, such that light reflected by the relief modulation is at least partially out-coupled from the core.

15. An optical device as claimed in claim 14, further comprising a photodetector disposed to receive at least a portion of the out-coupled light.

* * * * *

UNITED STATES PATENT AND TRADEMARK OFFICE
CERTIFICATE OF CORRECTION

PATENT NO. : 7,006,733 B2  
APPLICATION NO. : 10/760398  
DATED : February 28, 2006  
INVENTOR(S) : Galstain et al.

Page 1 of 1

It is certified that error appears in the above-identified patent and that said Letters Patent is hereby corrected as shown below:

On Title page  
Item [63]  
Upon review of the Filing Receipt (copy enclosed), we have noticed an error in the Domestic Priority Data. The Domestic Priority Data should read --This application is a CON of United States Patent Application No. 10/658,258 09/10/2003 which is a CIP of 60/409,233 09/10/2002-- rather than "This application is a CON of United States Patent Application No. 10/658,258 09/10/2003 which is a CIP of 60/409,233 09/10/2002 and this application 10/760,398 is CON of 10/658,462 09/10/2003 which claims benefit of 60/409,197 09/10/2002"; as shown.

Signed and Sealed this

Ninth Day of October, 2007

JON W. DUDAS  
*Director of the United States Patent and Trademark Office*